US010939623B2

(12) United States Patent
Miyahara et al.

(10) Patent No.: US 10,939,623 B2
(45) Date of Patent: Mar. 9, 2021

(54) COMPLETELY AUTOMATED MULTI-SHELF SEEDLING GROWING SYSTEM

(71) Applicant: ELM INC., Minamisatsuma (JP)

(72) Inventors: Takakazu Miyahara, Minamisatsuma (JP); Kengo Wada, Minamisatsuma (JP); Masato Takeda, Minamisatsuma (JP); Shigemi Omochi, Minato-ku (JP)

(73) Assignee: ELM INC., Minamisatsuma (JP)

( * ) Notice: Subject to any disclaimer, the term of this patent is extended or adjusted under 35 U.S.C. 154(b) by 186 days.

(21) Appl. No.: 16/098,052

(22) PCT Filed: Apr. 28, 2017

(86) PCT No.: PCT/JP2017/017020
§ 371 (c)(1),
(2) Date: Oct. 31, 2018

(87) PCT Pub. No.: WO2017/191819
PCT Pub. Date: Nov. 9, 2017

(65) Prior Publication Data
US 2019/0150375 A1    May 23, 2019

(30) Foreign Application Priority Data

May 2, 2016   (JP) .............................. JP2016-092418
Dec. 2, 2016  (JP) .............................. JP2016-234956

(51) Int. Cl.
*A01G 9/00*   (2018.01)
*A01G 9/02*   (2018.01)
(Continued)

(52) U.S. Cl.
CPC .............. *A01G 9/143* (2013.01); *A01G 9/00* (2013.01); *A01G 9/02* (2013.01); *A01G 9/023* (2013.01);
(Continued)

(58) Field of Classification Search
CPC ........ A01G 9/143; A01G 9/0299; A01G 9/00; A01G 9/02; A01G 9/023; A01G 9/20;
(Continued)

(56) References Cited

U.S. PATENT DOCUMENTS 5,934,011 A      8/1999  Ishioka et al.
2013/0264934 A1  10/2013 Osaki et al.
(Continued)

FOREIGN PATENT DOCUMENTS

CN    1228007 A    9/1999
CN    103220902 A  7/2013
(Continued)

OTHER PUBLICATIONS

Mar. 2020 Office Action issued in Chinese Patent Application No. 201780027330.1.
(Continued)

*Primary Examiner* — Joshua J Michener
*Assistant Examiner* — Brittany A Lowery
(74) *Attorney, Agent, or Firm* — Oliff PLC

(57) ABSTRACT

A seedling growing system includes: a cargo transport container provided with heat insulating treatment; a movement robot for moving on a path in the cargo transport container; seedling growing tray racks including a multi-shelf germination rack for holding, until germination, a seedling growing tray on which seeds are sown, a multi-shelf seedling growing rack for holding a seedling growing tray on which seedlings have germinated, and a multi-shelf shipment rack for holding a seedling growing tray for shipping grown seedlings; and an arm or table provided to the movement robot and capable of transferring each seedling growing tray between the movement robot and each of the multi-shelf germination rack, multi-shelf seedling growing rack, and the multi-shelf shipment rack.

8 Claims, 10 Drawing Sheets

(51) Int. Cl.
  *A01G 9/20*    (2006.01)
  *A01G 9/14*    (2006.01)
  *A01G 9/029*   (2018.01)
  *A01G 9/24*    (2006.01)

(52) U.S. Cl.
  CPC .............. *A01G 9/0299* (2018.02); *A01G 9/20* (2013.01); *A01G 9/247* (2013.01)

(58) Field of Classification Search
  CPC ....... A01G 9/247; B65G 1/0435; B66F 9/141; B66F 9/07
  See application file for complete search history.

(56) References Cited

U.S. PATENT DOCUMENTS

| | | | | |
|---|---|---|---|---|
| 2014/0017043 | A1* | 1/2014 | Hirai | ................... A01G 27/00 414/267 |
| 2016/0014977 | A1* | 1/2016 | Esaki | ................... A01G 9/246 47/66.6 |
| 2017/0027110 | A1 | 2/2017 | Ito et al. | |
| 2018/0235156 | A1* | 8/2018 | Blair | ................... A01G 9/18 |

FOREIGN PATENT DOCUMENTS

| | | |
|---|---|---|
| CN | 103491766 A | 1/2014 |
| CN | 106163262 A | 11/2016 |
| EP | 9 202 46 A1 | 6/1999 |
| EP | 2 644 020 A1 | 10/2013 |
| EP | 2 712 499 A1 | 4/2014 |
| EP | 3 127 420 A1 | 2/2017 |
| JP | S51-014676 A | 2/1976 |
| JP | S52-163880 U | 12/1977 |
| JP | S61-166337 A | 7/1986 |
| JP | H04-10843 U | 1/1992 |
| JP | H06-183515 A | 7/1994 |
| JP | 2001-506867 A | 5/2001 |
| JP | 2003-052253 A | 2/2003 |
| JP | 2003-180158 A | 7/2003 |
| JP | 2004-16232 A | 1/2004 |
| JP | 2008-118957 A | 5/2008 |
| JP | 3158246 U | 3/2010 |
| JP | 2011-001149 A | 1/2011 |
| JP | 2012131585 A * | 7/2012 |
| JP | 2012-210185 A | 11/2012 |
| JP | 2014-061004 A | 4/2014 |
| JP | 2015-195786 A | 11/2015 |
| JP | 2015-223082 A | 12/2015 |
| WO | 2015/152206 A1 | 10/2015 |
| WO | WO-2016061637 A1 * | 4/2016 ............. A01G 9/022 |
| WO | 2016/120368 A1 | 8/2016 |

OTHER PUBLICATIONS

Jul. 25, 2017 International Search Report issued in International Patent Application No. PCT/JP2017/017020.

Jan. 15, 2019 Office Action issued in Japanese Patent Application No. 2018-515724.

Aug. 30, 2018, International Preliminary Report on Patentability issued in International Application No. PCT/JP2017/017020.

May 2019 Office Action issued in Japanese Application No. 2018-515724.

Dec. 19, 2019 Office Action issued in Korean Patent Application No. 10-2018-7031501.

* cited by examiner

Fig. 8
(a)
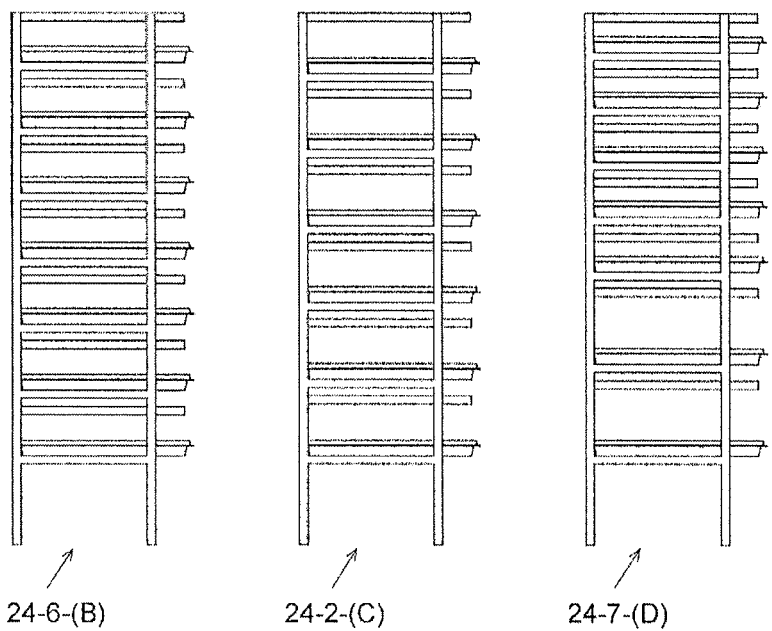
24-6-(B)   24-2-(C)   24-7-(D)
(b)
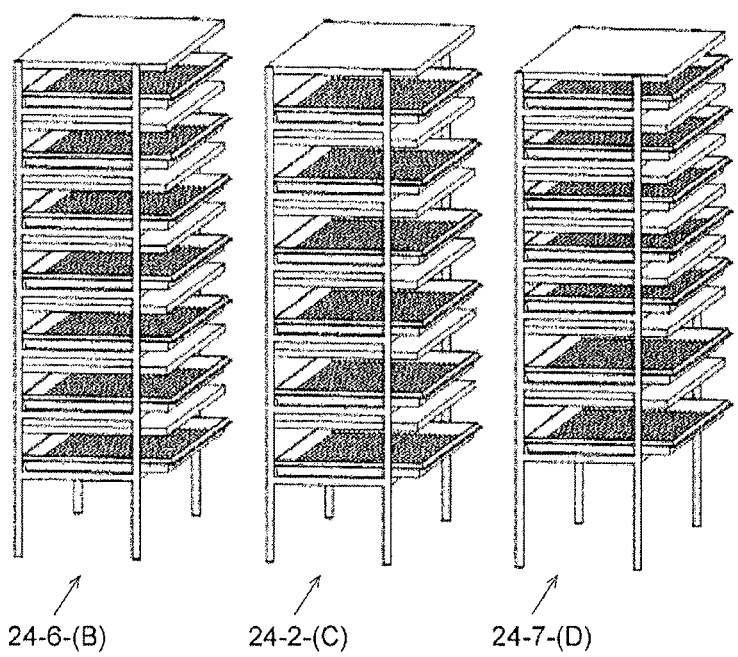
24-6-(B)   24-2-(C)   24-7-(D)

Fig. 9

| MULTI-SHELF SEEDLING GROWING | 24-1-(A) | 24-3-(A) | 24-1-(A) | 24-7-(D) | 24-9-(B) | 24-10-(B) | 24-8-(B) | 24-6-(B) | 24-4-(C) | 24-2-(C) |
|---|---|---|---|---|---|---|---|---|---|---|
| FIRST SHELF | SEEDLING GROWING TRAY 1 - FIRST DAY | SEEDLING GROWING TRAY 2 - SECOND DAY | SEEDLING GROWING TRAY 3 - THIRD DAY | SEEDLING GROWING TRAY 4 - FOURTH DAY | SEEDLING GROWING TRAY 1 - FIFTH DAY | SEEDLING GROWING TRAY 1 - SIXTH DAY | SEEDLING GROWING TRAY 1 - SEVENTH DAY | SEEDLING GROWING TRAY 1 - EIGHTH DAY | SEEDLING GROWING TRAY 1 - NINTH DAY | SEEDLING GROWING TRAY 7 - NINTH DAY |
| SECOND SHELF | SEEDLING GROWING TRAY 2 - FIRST DAY | SEEDLING GROWING TRAY 3 - SECOND DAY | SEEDLING GROWING TRAY 4 - THIRD DAY | SEEDLING GROWING TRAY 5 - FOURTH DAY | SEEDLING GROWING TRAY 2 - FIFTH DAY | SEEDLING GROWING TRAY 2 - SIXTH DAY | SEEDLING GROWING TRAY 2 - SEVENTH DAY | SEEDLING GROWING TRAY 2 - EIGHTH DAY | SEEDLING GROWING TRAY 2 - NINTH DAY | SEEDLING GROWING TRAY 1 - TENTH DAY |
| THIRD SHELF | SEEDLING GROWING TRAY 3 - FIRST DAY | SEEDLING GROWING TRAY 4 - SECOND DAY | SEEDLING GROWING TRAY 5 - THIRD DAY | SEEDLING GROWING TRAY 6 - FOURTH DAY | SEEDLING GROWING TRAY 3 - FIFTH DAY | SEEDLING GROWING TRAY 3 - SIXTH DAY | SEEDLING GROWING TRAY 3 - SEVENTH DAY | SEEDLING GROWING TRAY 3 - EIGHTH DAY | SEEDLING GROWING TRAY 3 - NINTH DAY | SEEDLING GROWING TRAY 2 - TENTH DAY |
| FOURTH SHELF | SEEDLING GROWING TRAY 4 - FIRST DAY | SEEDLING GROWING TRAY 5 - SECOND DAY | SEEDLING GROWING TRAY 6 - THIRD DAY | SEEDLING GROWING TRAY 7 - FOURTH DAY | SEEDLING GROWING TRAY 4 - FIFTH DAY | SEEDLING GROWING TRAY 4 - SIXTH DAY | SEEDLING GROWING TRAY 4 - SEVENTH DAY | SEEDLING GROWING TRAY 4 - EIGHTH DAY | SEEDLING GROWING TRAY 4 - NINTH DAY | SEEDLING GROWING TRAY 3 - TENTH DAY |
| FIFTH SHELF | SEEDLING GROWING TRAY 5 - FIRST DAY | SEEDLING GROWING TRAY 6 - SECOND DAY | SEEDLING GROWING TRAY 7 - THIRD DAY | (BACKUP) | SEEDLING GROWING TRAY 5 - FIFTH DAY | SEEDLING GROWING TRAY 5 - SIXTH DAY | SEEDLING GROWING TRAY 5 - SEVENTH DAY | SEEDLING GROWING TRAY 5 - EIGHTH DAY | SEEDLING GROWING TRAY 5 - NINTH DAY | SEEDLING GROWING TRAY 4 - TENTH DAY |
| SIXTH SHELF | SEEDLING GROWING TRAY 6 - FIRST DAY | SEEDLING GROWING TRAY 7 - SECOND DAY | SEEDLING GROWING TRAY 1 - FOURTH DAY | SEEDLING GROWING TRAY 6 - TENTH DAY | SEEDLING GROWING TRAY 6 - FIFTH DAY | SEEDLING GROWING TRAY 6 - SIXTH DAY | SEEDLING GROWING TRAY 6 - SEVENTH DAY | SEEDLING GROWING TRAY 6 - EIGHTH DAY | SEEDLING GROWING TRAY 6 - NINTH DAY | SEEDLING GROWING TRAY 5 - TENTH DAY |
| SEVENTH SHELF | SEEDLING GROWING TRAY 7 - FIRST DAY | SEEDLING GROWING TRAY 1 - THIRD DAY | SEEDLING GROWING TRAY 2 - FOURTH DAY | SEEDLING GROWING TRAY 7 - TENTH DAY | SEEDLING GROWING TRAY 7 - FIFTH DAY | SEEDLING GROWING TRAY 7 - SIXTH DAY | SEEDLING GROWING TRAY 7 - SEVENTH DAY | SEEDLING GROWING TRAY 7 - EIGHTH DAY | | |
| EIGHTH SHELF | SEEDLING GROWING TRAY 1 - SECOND DAY | SEEDLING GROWING TRAY 2 - THIRD DAY | SEEDLING GROWING TRAY 3 - FOURTH DAY | | | | | | | |

Fig. 11
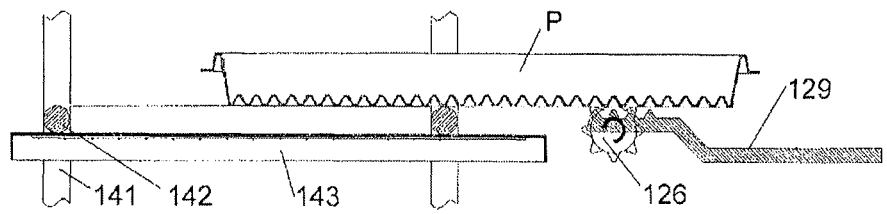
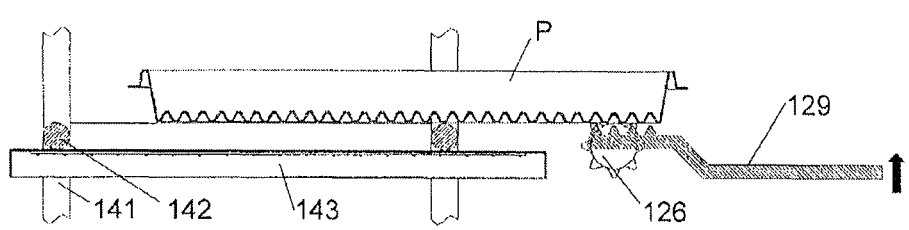
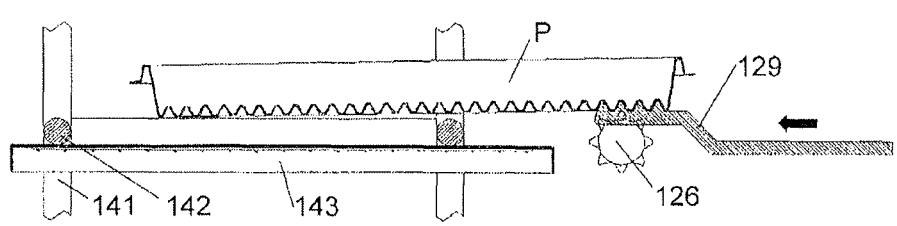
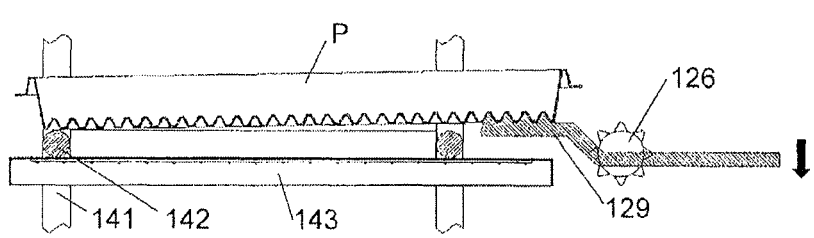
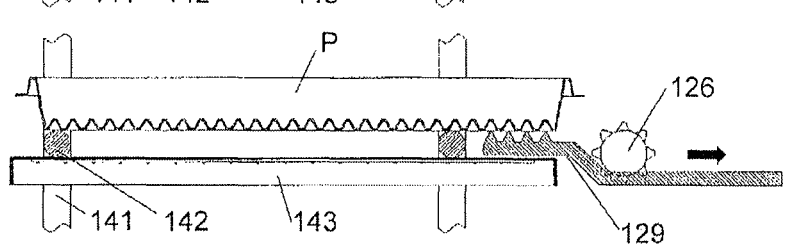
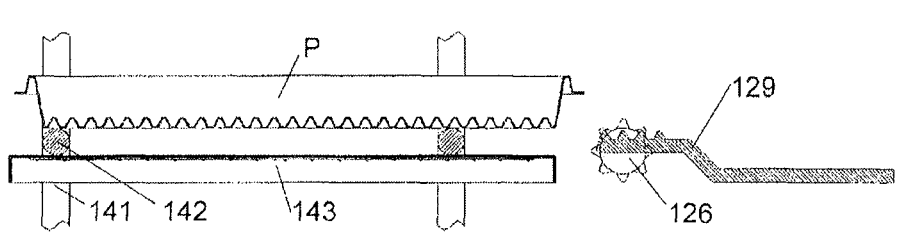

COMPLETELY AUTOMATED MULTI-SHELF SEEDLING GROWING SYSTEM

TECHNICAL FIELD

The present invention relates to a system configured to efficiently produce seedlings of agricultural crops and gardening plants.

BACKGROUND ART

Every year a large volume of seedlings of agricultural crops and gardening plants are produced. When seedlings are grown in a typically used vinyl greenhouse or conservatory, the growth is largely affected by climate and weather, and the seedlings often suffer from disease and pest. This necessitates spraying of agricultural chemicals, which causes problems.

Recently, in order to bring agricultural crops and gardening plants to market at an earlier timing or at a shifted timing (or in order to cause flowers to bloom at an earlier timing or at a shifted timing), there are needs in general for seedlings at a timing different from the natural timing, that is when plants does not naturally grow. When a typical vinyl greenhouse or conservatory is used, however, heating is easy, but high-power cooling exceeding the incoming heat by the sunlight is needed to produce seedlings of plants that require cool environment to grow in summertime. This is not realistic.

When seedlings of a short-day blossoming plant such as *chrysanthemum* are produced from summer to fall with sunlight alone, they blossom before the plant body grows large, which is another problem.

The above-described problems can be solved when plants are grown in a closed environment using an artificial light without using sunlight. Thus, in recent years, vegetables have been grown in closed environments of plant factories. Since such a plant factory cultivates plants in a closed space, cultivation units are in many cases arranged in rows and columns (horizontally and vertically) to increase the space efficiency.

Technologies for production of seedlings in such a plant factory are disclosed in, for example, Patent Literatures 1 to 3. At transport of seedlings, it is necessary to take out a pad from a multi-shelf rack. Since a plurality of (four, for example) cell trays filled with soil and grown seedlings are arranged on a pad, the pad may weigh about 15 kg when four cell trays are placed on it. When configurations disclosed in Patent Literatures 1 to 3 are applied to growing of seedlings, the pad needs to be manually taken out, which is of course not efficient. In addition, when a rack of 1.3 m or taller is used, a stepladder is needed, and the operator needs to climb up and down the stepladder and move it to another place each time a pad is taken out from a rack, which further decrease the operation efficiency.

CITATION LIST

Patent Literature

Patent Literature 1: JP 2003-052253 A
Patent Literature 2: JP 2008-118957 A
Patent Literature 3: Registered Utility Model No. 3158246

SUMMARY OF INVENTION

Technical Problem

The present invention is intended to solve the above-described problems, and provide an inexpensive system capable of achieving efficient mass production of vegetable and flower seedlings in a closed environment without being influenced by the weather or seasons and without imposing a heavy load on the operators.

Solution to Problem

To solve the above-described problems, a seedling growing system according to the present invention includes:

a) a storage provided with heat insulating treatment;
b) a movement means configured to move on a predetermined path in the storage;
c) seedling growing tray racks including: a multi-shelf germination rack configured to hold, until germination, a seedling growing tray on which seeds are sown; a multi-shelf seedling growing rack configured to hold a seedling growing tray on which seedlings have germinated and including an artificial light source and an automatic watering device; and a multi-shelf shipment rack configured to hold a seedling growing tray for shipping grown seedlings, the racks being disposed side by side on a side or sides of the path in the storage; and
d) a transfer means provided to the movement means and configured to transfer each seedling growing tray between the movement means and each of the multi-shelf germination rack, the multi-shelf seedling growing rack, and the multi-shelf shipment rack.

In the seedling growing system according to the present invention, "seedlings" to be grown not only include plant bodies (narrowly defined seedlings) to be transplanted to a field or the like as seedlings after being grown by using the seedling growing system according to the present invention, but also include plant bodies to be directly shipped. Such plant bodies to be directly shipped include such plants that are cultivated within a relatively small number of days and shipped in low maturity states, which may be called vegetable shoot, germinated vegetable, sprout, young vegetable, micro herb, micro leaf, micro green, and baby leaf.

Cultivation methods used in the seedling growing system according to the present invention are not particularly limited, and include soil cultivation, hydroponic cultivation, and other cultivation using artificial culture media.

The storage used in the present invention is a storage having a size enough to allow an operator to enter the storage to work and enough to house the seedling growing tray racks. For example, an inexpensive typical cargo transport container used in land transport and marine transport can be preferably used. A plurality of standardized types of cargo transport containers are available, and a 20-foot container and a 40-foot container are mainly used. In the present invention, it is desirable to use the 40-foot container, because a larger number of multi-shelf germination racks, multi-shelf seedling growing racks, and multi-shelf shipment racks can be housed. When the 40-foot container is provided with heat insulating treatment by entirely covering its wall surface, ceiling, and underfloor surface with a heat insulating member having a thickness of about 40 mm, the internal space of the container has a length of about 12000 mm, a width of about 2300 mm, and a height of about 2360 mm. In this case, for example, three multi-shelf germination racks, in each of which a pad having an inside dimension of about 600 mm×1200 mm and capable of accommodating four typically-used seedling growing trays can be placed at each of a plurality of (for example, ten) shelves, ten multi-shelf seedling growing racks in each of which the same pad can be placed at each of a plurality of (for example, five) shelves at the vertical interval larger than that of the multi-shelf germination racks, and one multi-shelf shipment rack for performing shipment work from inside to outside of the container can be placed on the side or sides of the path.

When an operator performs shipment work, it is desirable that the total height of the multi-shelf shipment rack is set low so that the work can be easily performed. When automatic shipment work is performed in cooperation with the movement means as described later, the multi-shelf shipment rack may have a height equal to those of the germination racks and the seedling growing racks. The path may be placed on one side of the storage, but it is desirable that the path is placed at the center of the storage and these racks are arranged on both sides of the path so that the depths of the racks are reduced to facilitate a take-out operation of the trays from the racks. This configuration significantly improves space use efficiency of the storage.

In a case of the above-described exemplary container, the width of the path is approximately 800 mm. The work of taking a pad having a weight of as heavy as 15 kg and a size of as large as 1200 mm×600 mm into and out from, particularly, an upper part of a multi-shelf rack and transporting the pad to another place are laborious even in a relatively large space. The work becomes even difficult when these operations should be done through such a narrow path. Thus, the seedling growing system according to the present invention includes a movement means configured to move on the path, and a transfer means provided to the movement means and configured to transfer a seedling growing tray between a rack and the movement means. The movement means may include a power source (such as a motor) for movement or may be manually moved by an operator. The movement means may move on tires, but more desirably move on rails. The transfer means may include an electric motor as a power source or may be driven by a handle operated by, for example, an operator. Even in the latter case, the workload of the operator is significantly reduced as compared to transferring the tray with hands.

The seedling growing system according to the present invention preferably includes an environment control means configured to control environmental factors in the storage, such as temperature at day and night, light source parameters such as the intensity, wavelength ratio, and illumination time of the artificial light source, a watering interval, the concentration of carbon dioxide gas, and humidity in accordance with the plant being grown. These environmental factors may be set at different values between the multi-shelf germination rack, the multi-shelf seedling growing rack and the multi-shelf shipment rack, or may be set at the same value in the entire container. For example, the light source parameters and the watering interval are preferably set at different values between the timings of germination, seedling growing and shipment, and further set at different values between the multi-shelf germination rack, the multi-shelf seedling growing rack, and the multi-shelf shipment rack because they can be easily set for each rack. With respect to the temperature, the humidity and the carbon dioxide gas concentration, it is easier to set them at the same values in the entire storage, but they can be set to be different values between the racks. For example, the temperature of the multi-shelf germination rack can be set at a value higher than those of the multi-shelf seedling growing rack and the multi-shelf shipment rack by, for example, enclosing the multi-shelf germination rack with a high-heat-insulating curtain or the like.

In a conventional conservatory that uses sunlight, the growth of seedlings is affected by season and weather. However, when the environment control means is used to control the illumination intensity, the illumination time, the temperature, and other factors as described above, seedlings can be stably grown irrespective of season and weather.

In the seedling growing system according to the present invention, the movement means is preferably provided with an elevation device configured to change the height of a seedling growing tray in order to match the height of the seedling growing tray with the heights of shelves of transfer destination racks and transfer source racks. However, when the number of shelves of the multi-shelf germination rack, the multi-shelf seedling growing rack and the multi-shelf shipment rack is the same, and further when the heights of the shelves are same, the movement means may be provided with a rack including the same number of shelves having the same heights, which allows omission of the elevation device. By using these movement means and transfer means, the operator can easily move a seedling growing tray from the multi-shelf germination rack to the multi-shelf seedling growing rack or from the multi-shelf seedling growing rack to the multi-shelf shipment rack.

The transfer means preferably includes a holding unit capable of moving from the movement means vertically to the path and substantially horizontally, and a rack-and-pinion pinion gear provided at a leading end of the holding unit. When the movement means is used, wavy steps are provided on the bottom surface of a seedling growing tray so that recesses of the steps are equally spaced, and the recesses are used as a rack. With this configuration, the seedling growing tray is moved between each seedling growing tray rack (multi-shelf germination rack, multi-shelf seedling growing rack, or multi-shelf shipment rack) and the holding unit through a rack-and-pinion mechanism with the pinion gear. Such wavy steps have not only the function of a rack-and-pinion rack but also the function of increasing the strength of the seedling growing tray.

When the transfer means includes the pinion gear, the transfer means preferably includes an auxiliary movement means configured to move each seedling growing tray between the seedling growing rack and the pinion gear. With this configuration, a seedling growing tray can be transferred between a seedling growing tray rack and the holding unit without moving the pinion gear toward the seedling growing tray rack. This saves the space in the height direction (or interval) between each shelf of the seedling growing tray rack. Accordingly, the number of shelves of the seedling growing tray rack can be increased to achieve high productivity of the seedlings.

The seedling growing trays that can be used in the present invention include a normal single-cell seedling growing tray, and a cell tray composed of a plurality of wedge shaped pots (cells). The seedling growing trays that can be used in the present invention may further include a pad in which a plurality of normal seedling growing trays or a plurality of cell trays are arranged. In place of the normal seedling growing trays and the cell trays, for example, vinyl pots or plastic or ceramic bowls may be arranged on a pad. In the present invention, a seedling growing tray may include these pots or bowls arranged on a pad. In addition, in hydroponic cultivation, it is possible to use a seedling growing tray in which a medium such as hemp cloth, palm shell mat, urethane sponge, or rock wool is arranged or bedded.

The multi-shelf seedling growing rack is provided with an artificial light source and an automatic watering device for supplying light and water necessary for growth to seedlings. No light irradiation is needed in many cases until germination of seeds from soil, and no additional watering is needed if the soil is initially provided with moisture. Thus, it is not essential that the multi-shelf germination rack is provided with the artificial light source and the automatic watering device. However, since some plants need light and/or water for germination, the multi-shelf germination rack may be provided with the artificial light source and/or the automatic watering device when such plants are to be grown to seedlings. In addition, a means configured to change the position of the artificial light source between different racks or in a rack may be provided. With this configuration, the artificial light source can be moved to a position where a larger amount of light is needed in accordance with the growth of seedlings at each rack, which allows efficient use of the artificial light source.

The multi-shelf shipment rack is used to hold a seedling growing tray for the work of shipping grown seedlings. The multi-shelf shipment rack is also used as a take-in rack for taking a tray on which seeds are sown into the storage. The shipment work and the take-in work may be performed by an operator or performed by using a device dedicated for each work. Before the shipment time (usually nighttime), a plurality of seedling growing trays to be shipped are moved from the multi-shelf seedling growing rack to the multi-shelf shipment rack by the movement means, and then at shipment time (usually daytime), the operator performs the shipment work without transporting the seedling growing trays from the multi-shelf seedling growing rack. A tray on which seeds have been sown may be placed on an emptied multi-shelf shipment rack after the shipment has ended, and thereafter may be transferred onto the germination rack by the movement means. When the multi-shelf shipment rack is placed on a door side (entrance side) of the storage, the shipment work and take-in work by the operator can be more easily performed.

In order to further improve operation efficiency, each seedling growing tray rack may be provided with casters. In particular, when the multi-shelf shipment rack is provided with casters, it can also be used as a transport truck, and thus the shipment work and take-in work by the operator become far easier.

Each seedling growing tray rack may include shelves having different heights (pitches). As a particularly useful example, the multi-shelf seedling growing rack includes shelves having different pitches. For example, a "small" pitch for a period right after germination, an "intermediate" pitch for a period halfway through growing, and a "large" pitch for growth right before shipment are assumed in accordance with the growth of housed plant bodies. In this example, the multi-shelf seedling growing rack includes shelves having the three kinds of pitches of "large", "intermediate", and "small". The multi-shelf seedling growing racks may be composed of a plurality of racks having different pitches (whereas the pitch is constant in each rack), or of a rack or racks each including a plurality of shelves having different pitches. An example of multi-shelf seedling growing racks being a plurality of racks having different pitches is: two racks corresponding to the "large" pitch, in other words, two racks each include a smaller number of shelves; four racks each corresponding to the "intermediate" pitch and include an intermediate number of shelves; and three racks each corresponding to the "small" pitch and include a larger number of shelves. In another example, each rack includes a plurality of shelves having different pitches, where the rack includes two "large" shelves and four "small" shelves, or the rack includes one "large" shelf, two "intermediate" shelves, and three "small" shelves.

In this manner, when each multi-shelf seedling growing rack includes shelves having different pitches, height in the container can be effectively used in accordance with the growth of seedlings to increase the cultivation possible area per container, thereby improving the efficiency of cultivation. In addition, when each rack includes shelves having different pitches, the cultivation possible area per container can be further increased, thereby further improving the efficiency of cultivation. Moreover, when the number and pitches of shelves of each seedling growing tray rack are flexibly set in this manner, it is possible to flexibly handle simultaneous growing of plants having different cultivation conditions such as cultivation duration and size, switching of the plants, and mixture of a plant having different cultivation conditions during the switching.

In addition, the distance between each plant body and the artificial light source can be maintained constant by transferring a seedling growing tray to a shelf having a pitch in accordance with the growth stage of seedlings, thereby effectively utilizing energy from the artificial light source.

Advantageous Effects of Invention

A seedling growing system according to the present invention can achieve efficient mass production of vegetable and flower seedlings in a closed environment without influence of weather and season.

BRIEF DESCRIPTION OF DRAWINGS

FIG. 8 illustrates front views (a) and perspective views (b) of multi-shelf seedling growing racks in the seedling growing system according to the second embodiment.

FIG. 9 is a diagram illustrating movement of a seedling growing tray in the seedling growing system according to the second embodiment.

FIG. 11 illustrates cross-sectional views ((a-1) to (a-6)) of movement of a seedling growing tray in the seedling growing system according to the third embodiment.

DESCRIPTION OF EMBODIMENTS

Embodiments of a seedling growing system according to the present invention will be described below with reference to FIGS. 1 to 11.

Figure 1:
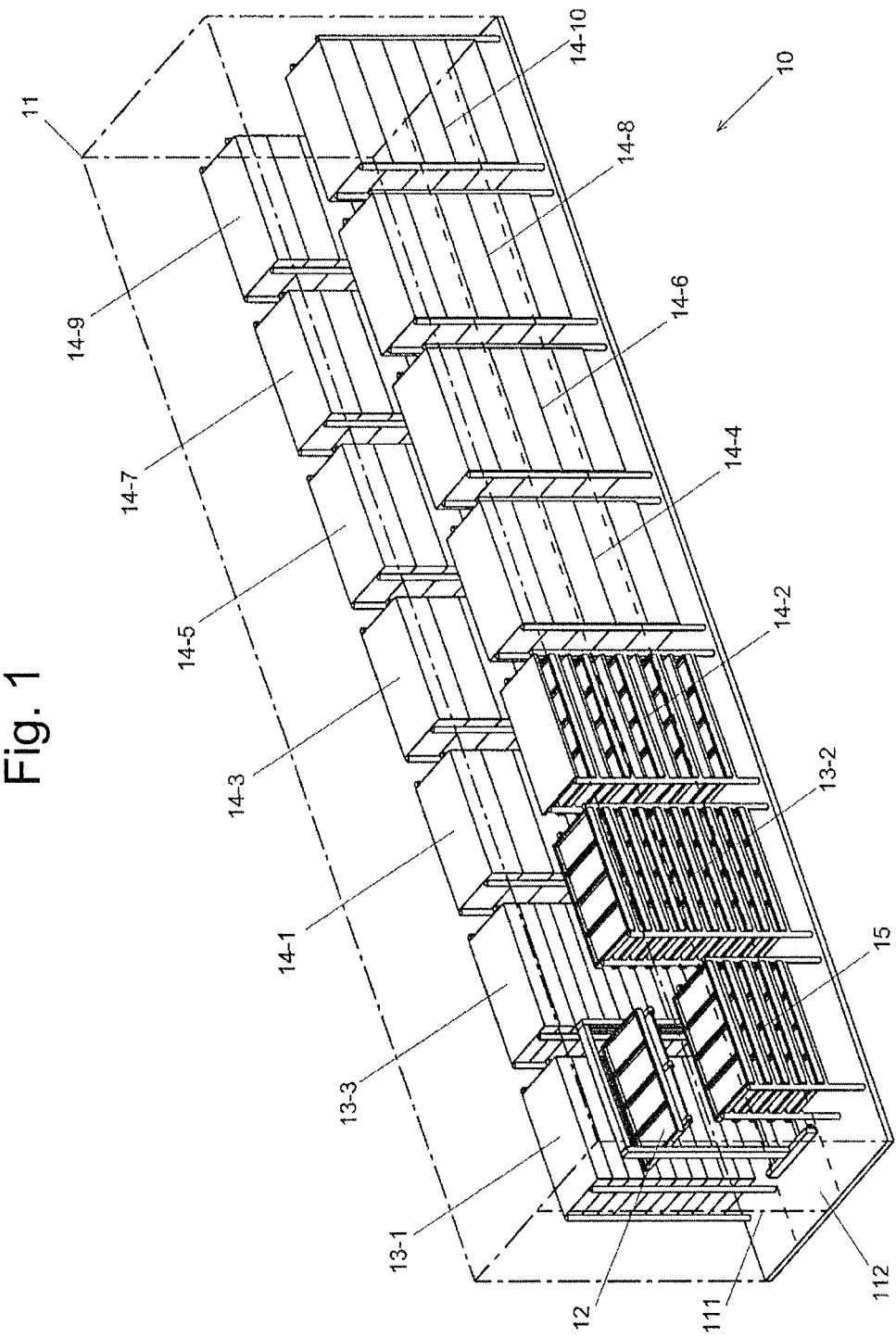
FIG. 1 is a perspective view illustrating inside of a cargo transport container in a seedling growing system according to a first embodiment of the present invention.

FIG. 1 is a perspective view illustrating inside of a cargo transport container (hereinafter referred to as "container 11") as a storage of a seedling growing system 10 according to a first embodiment. A double door 111 is provided at one of gable surfaces (surfaces at both ends in the longitudinal direction) of the container 11. A path 112 extending in the longitudinal direction is provided at a center in the width direction in the container 11. A movement robot (movement means) 12 is disposed on the path 112. Three multi-shelf germination racks 13 (13-1 to 13-3), ten multi-shelf seedling growing racks 14 (14-1 to 14-10), and one multi-shelf shipment rack (work rack) 15 are disposed on both sides of the path 112. Among these racks, the multi-shelf shipment rack 15 is disposed closer to the door 111 than the multi-shelf germination racks 13 and the multi-shelf seedling growing racks 14. With this configuration, it is easy to take a seedling growing tray on which seeds are sown into each multi-shelf germination rack 13, and take, out from the multi-shelf shipment rack 15, seedlings to be shipped. The multi-shelf germination racks 13 are preferably disposed closer to the door 111 than the multi-shelf seedling growing racks 14. With this configuration, it is possible to reduce influence of external air and external light on germinated seedlings when the door 111 is opened for shipment work or the like.

Completely automated seedling growing needs components such as a watering device, an air conditioning facility, a control device, an illumination apparatus, and a $CO_2$ discharge device. Thus, the seedling growing system 10 according to the present embodiment includes these devices (environment control means). However, these devices are not illustrated in FIG. 1 for simplification of the drawing.

Casters may be provided below the multi-shelf shipment rack 15. With this configuration, the multi-shelf shipment rack 15 has the function of a transport truck, which makes it easy for an operator to perform shipment work and take-in work. The multi-shelf germination racks 13 and the multi-shelf seedling growing racks 14 may be provided with casters to facilitate arrangement change and change places of the plants between racks including a different number of shelves.

Figure 2:
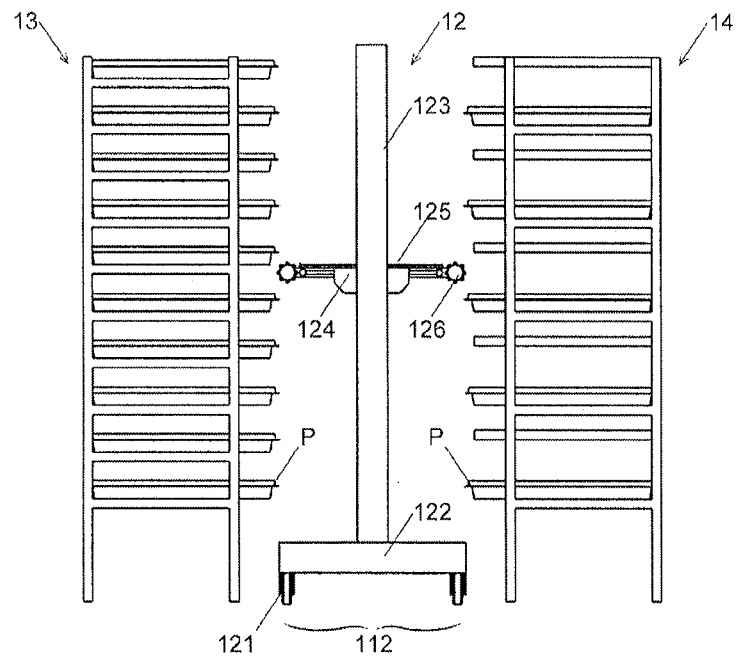
FIG. 2 is a front view of a movement robot, a multi-shelf germination rack, and a multi-shelf seedling growing rack in the seedling growing system according to the first embodiment.
Figure 3:
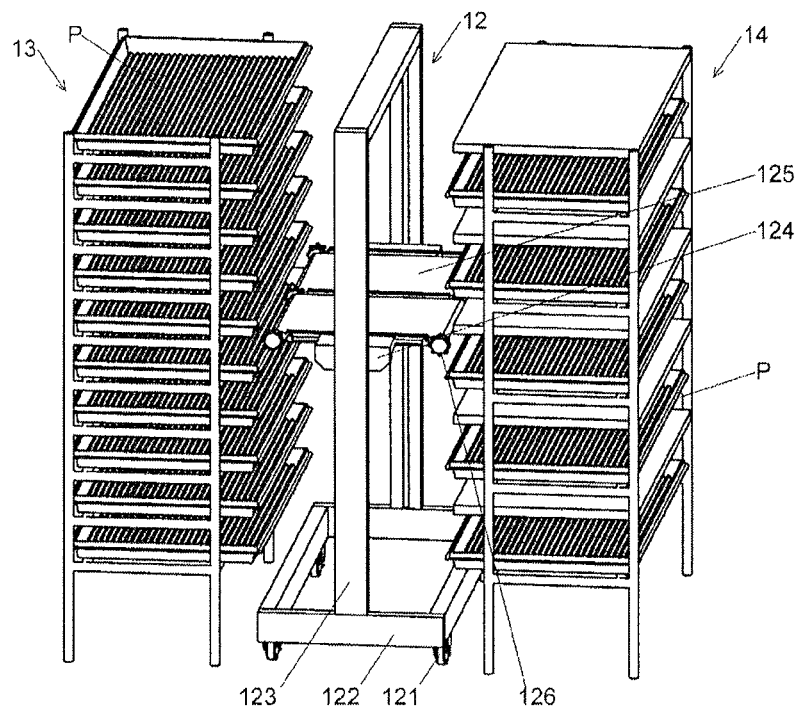
FIG. 3 is a perspective view of the movement robot, the multi-shelf germination rack, and the multi-shelf seedling growing rack in the seedling growing system according to the first embodiment.

FIG. 2 is a front view of the movement robot 12, each multi-shelf germination rack 13, and each multi-shelf seedling growing rack 14, and FIG. 3 is a perspective view of them. The multi-shelf seedling growing rack 14 has a shelf interval of approximately 300 mm to provide a space in which seedlings grow and a space in which an illumination apparatus is disposed, and includes five shelves. Since a large number of plants need no light at germination, the multi-shelf germination rack 13 has a reduced shelf interval of 150 mm, which is half of that of the multi-shelf seedling growing rack 14, to increase volumetric efficiency, and includes ten shelves. As a result, the three multi-shelf germination racks 13 can hold 30 pads P. When the duration of seedling growing is 10 days at longest, and five pads P are needed per day, the multi-shelf germination racks 13 are applicable to the germination duration of six days at longest.

The path 112 merely has a width of 800 mm, but the movement robot 12 needs to perform work of moving on this narrow path 112 by itself, taking out a pad P of 600 mm×1200 mm and weighing about 15 kg from one of the multi-shelf germination racks 13 arranged on both sides of the path 112, transporting the pad P, and housing the pad P in another multi-shelf seedling growing rack 14.

In the present embodiment, the movement robot 12 includes a truck 122 below which wheels 121 for moving along the path 112 are provided, two supports 123 erected on the truck 122 in the front-back direction (the longitudinal direction of the path 112), an elevation table 124 held between the two supports 123 and configured to move up and down, a slide table 125 placed on the elevation table 124 and capable of moving by about 150 mm (300 mm in total) to each side in the right-left direction (in the width direction of the path 112), and a plurality of pinion gears 126 attached to each of leading end parts of the slide table 125 on both sides. The combination of the slide table 125 and the pinion gears 126 corresponds to a transfer means described above, and the slide table 125 corresponds to a holding unit of the transfer means. Two rails (not illustrated) are laid on the path 112, and the movement robot 12 moves on the rails. With this configuration, the movement robot 12 moves with almost no shift of its position on the path 112 in the width direction, which leads to high position accuracy at operation of transferring a pad P to be described later.

The pad P includes, at the bottom, steps in a shape substantially matching with the tooth shape of each pinion gear 126. The steps of the pad P provide four effects of (i) facilitating movement by the movement robot 12 as described later, (ii) functioning as a reinforcement rib for increasing the stiffness of the thin resin pad, (iii) preventing an excessive amount of water in soil in a seedling growing tray and a cell tray arranged on the pad by separating the trays from the bottom surface of the pad, and (iv) preventing roots from extending out of the trays.

The movement robot 12 further includes drive sources (not illustrated) for rotating the wheels 121, moving upward and downward the elevation table 124, moving the slide table 125, and rotating the pinion gears 126. The drive sources are provided to these components, respectively, and controlled by remote control in a wireless manner.

Figure 4:
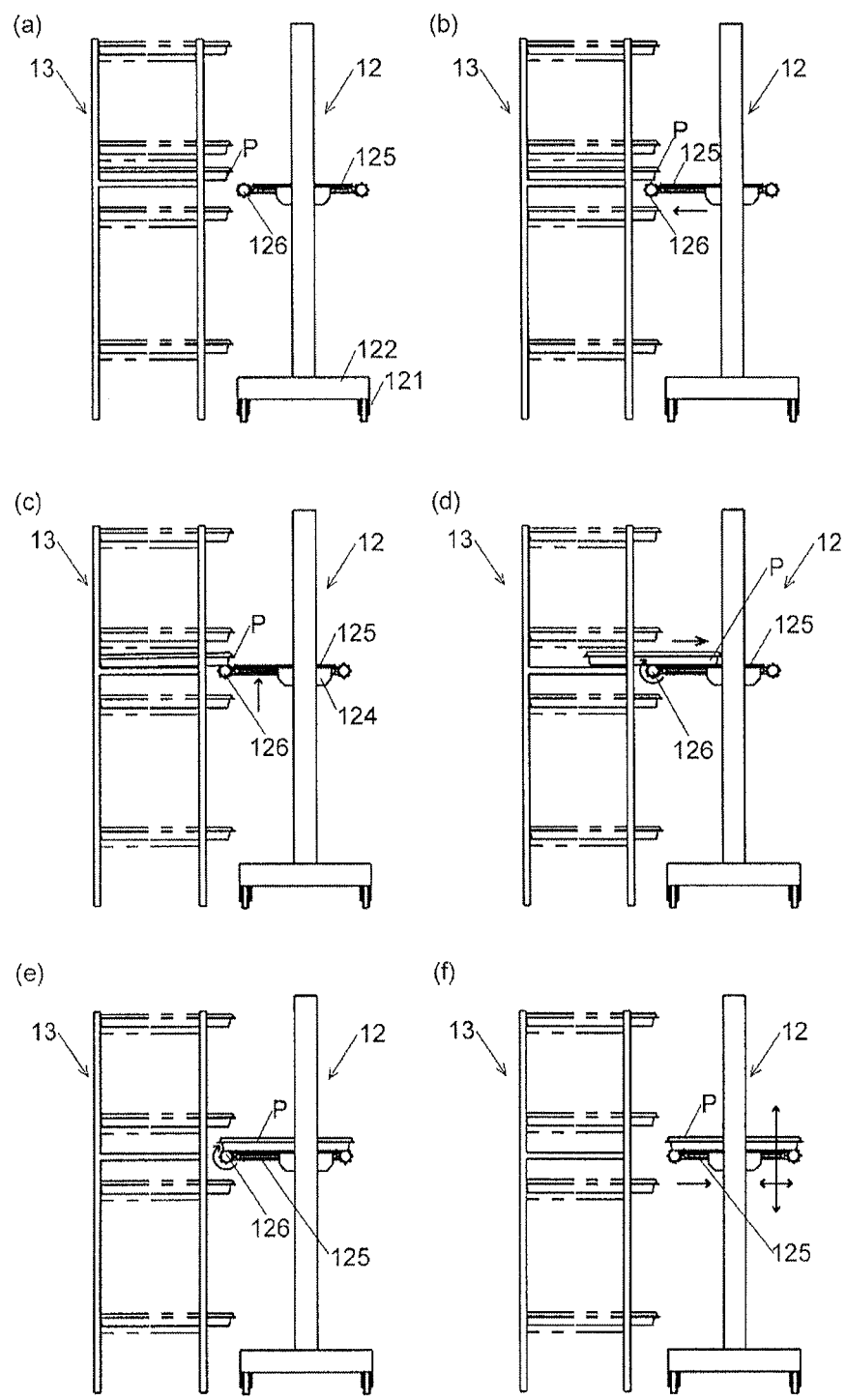
FIG. 4 is a schematic diagram illustrating operation of the seedling growing system according to the first embodiment.
Figure 5:
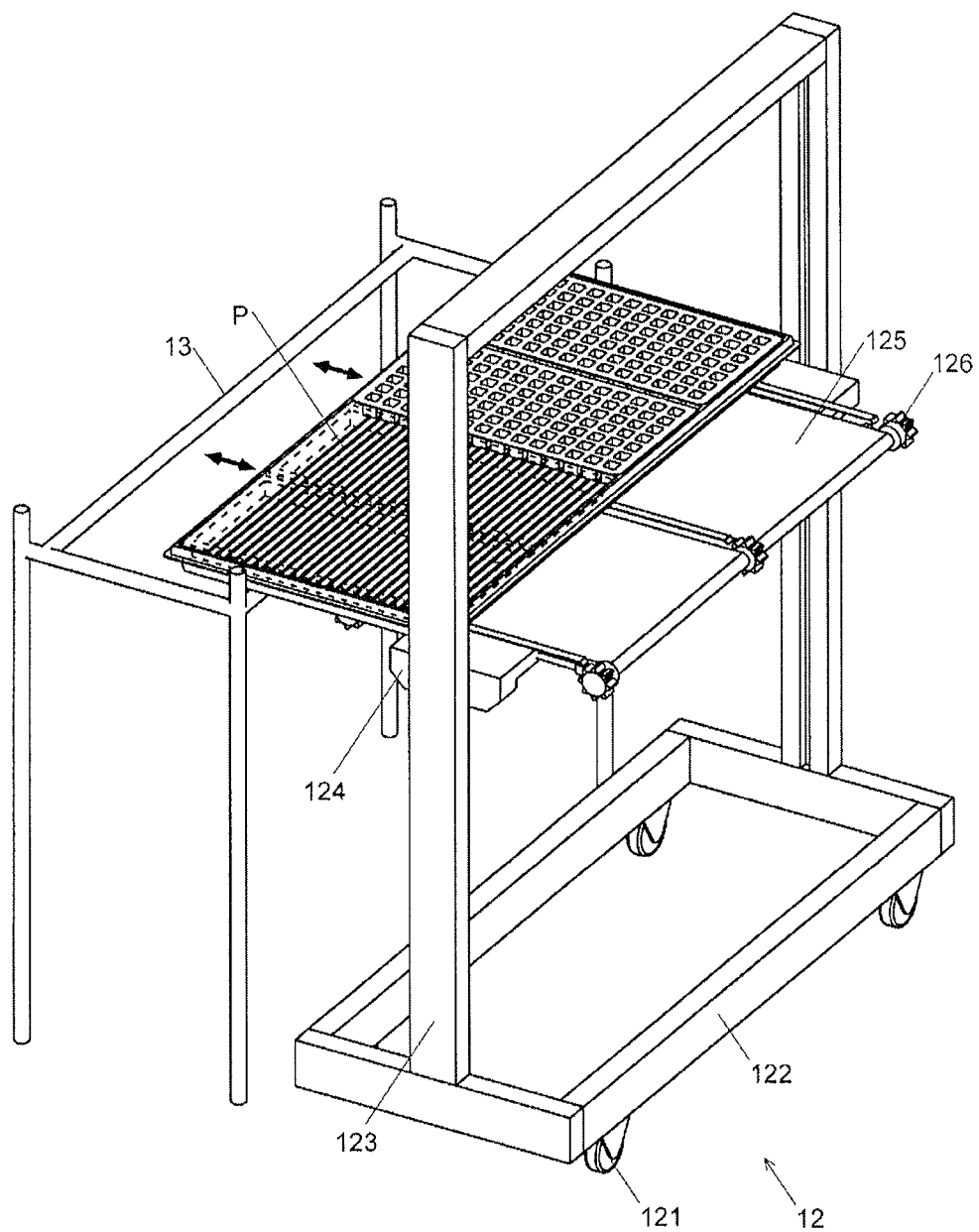
FIG. 5 is a perspective view illustrating the state of the seedling growing system according to the first embodiment in operation.

The following describes the operation of transferring a pad P by the movement robot 12 with reference to FIGS. 4 and 5. First, the movement robot 12 moves on the path 112 by itself, and stops at a position on the path 112 where a target rack (in this example, the multi-shelf germination rack 13) is disposed on a side (a). Subsequently, the elevation table 124 is adjusted to a height at which the pinion gears 126 enter between a movement target pad P placed on the multi-shelf germination rack 13 and another pad P placed below, and then the slide table 125 is moved in the right-left direction to a position where at least one tooth of the pinion gears 126 is meshed with steps on the bottom of the pad P (b). Subsequently, the elevation table 124 is moved up to a position where the pad P is slightly lifted up by the pinion gears 126 (c).

Then, the pinion gears 126 are rotated to draw the pad P onto the slide table 125 through the rack-and-pinion mechanism (FIGS. 4(d) and 5). When the pad P is drawn to a position near the center of the slide table 125, the rotation of the pinion gears 126 is stopped (e). When the pad P reaches this position, the pinion gears 126 provided at the right and left leading end parts of the slide table 125 are meshed with steps of the pad P. The slide table 125 is returned to the original standby position (f), and then the movement robot 12 is moved to a position on the path 112 where a transport destination rack (in this example, the multi-shelf seedling growing rack 14) is disposed on a side. Thereafter, the pad P can be placed on the multi-shelf seedling growing rack 14 through an operation opposite to the operation performed so far.

The operation of transferring a pad P from the multi-shelf germination rack 13 to the multi-shelf seedling growing rack 14 is described above. The operation of transferring a pad P from the multi-shelf seedling growing rack 14 to the multi-shelf shipment rack 15 is performed in the same manner. In reality, first, a pad P is transferred from the multi-shelf seedling growing rack 14 to the multi-shelf shipment rack 15, and then another pad P is transferred from the multi-shelf germination rack 13 to the multi-shelf seedling growing rack 14 thus emptied. Typically, the above-described work needs to be performed for each shelf, and thus needs to be repeated in the number of shelves of the multi-shelf seedling growing rack 14 or the multi-shelf shipment rack 15. However, the work can be executed in a time such as nighttime in which people's work is not affected, and thus does not need to be processed in a short time.

Figure 6:
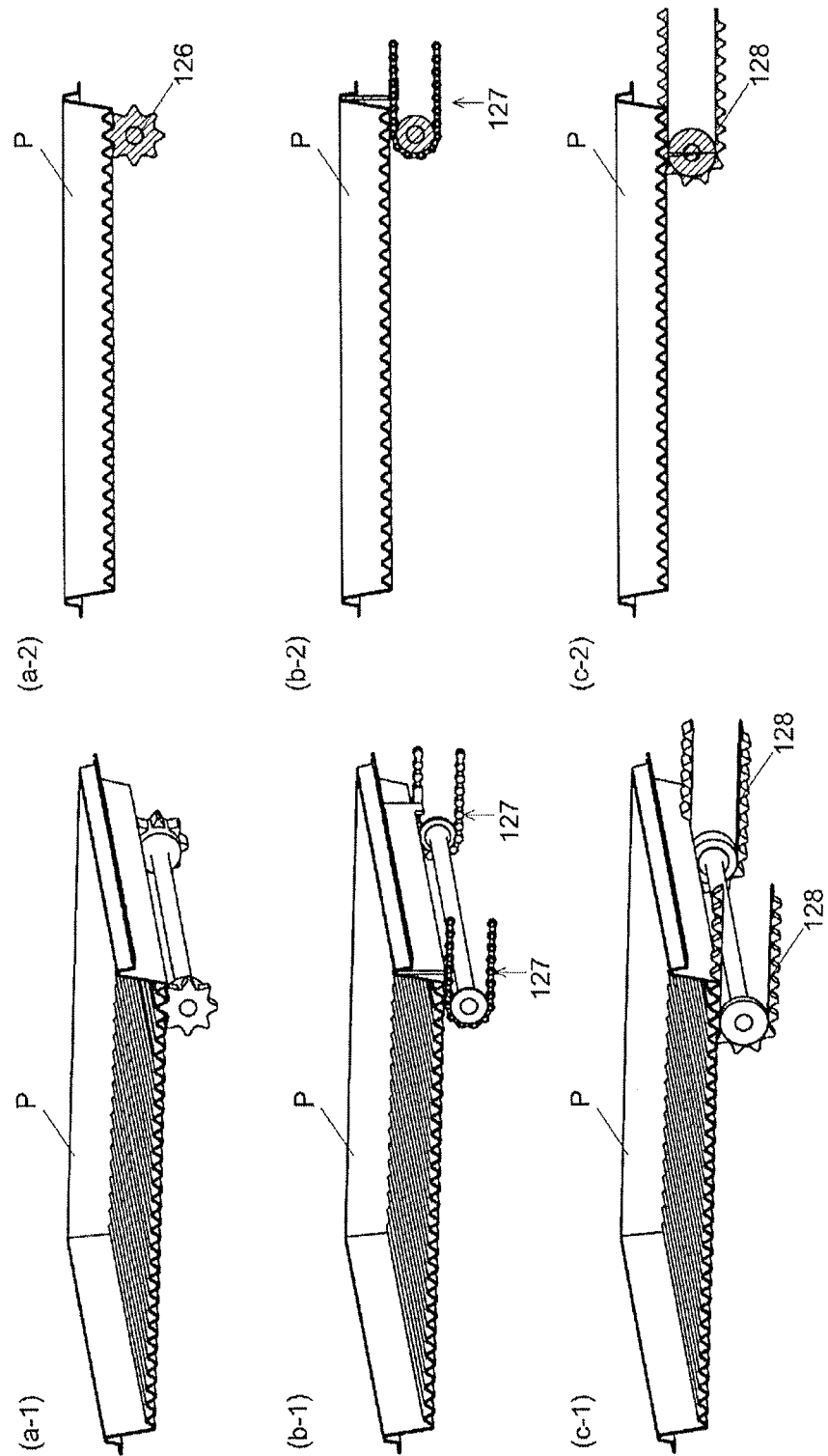
FIG. 6 illustrates perspective views ((a-1) to (c-1)) and cross-sectional views ((a-2) to (c-2)) of exemplary transfer means of the seedling growing system according to the first embodiment.

FIG. 6 illustrates perspective views ((a-1) to (c-1)) and cross-sectional views ((a-2) to (c-2)) of exemplary transfer means of the seedling growing system according to the present embodiment. In an example illustrated in (a-1) and (a-2), the above-described pinion gears 126 are used. In the example illustrated in (b-1) and (b-2), protrusions 127 are attached to a timing belt or a chain, and a pad P is taken out from or pushed into a rack by hooking the protrusions on part (for example, part of the steps on the bottom) of the pad P. In the example illustrated in (c-1) and (c-2), a double timing belt 128 having profiles on both sides is used, and the double timing belt 128 is meshed with steps on the bottom of the pad P, similarly to the pinion gears 126, when used.

Figure 7:
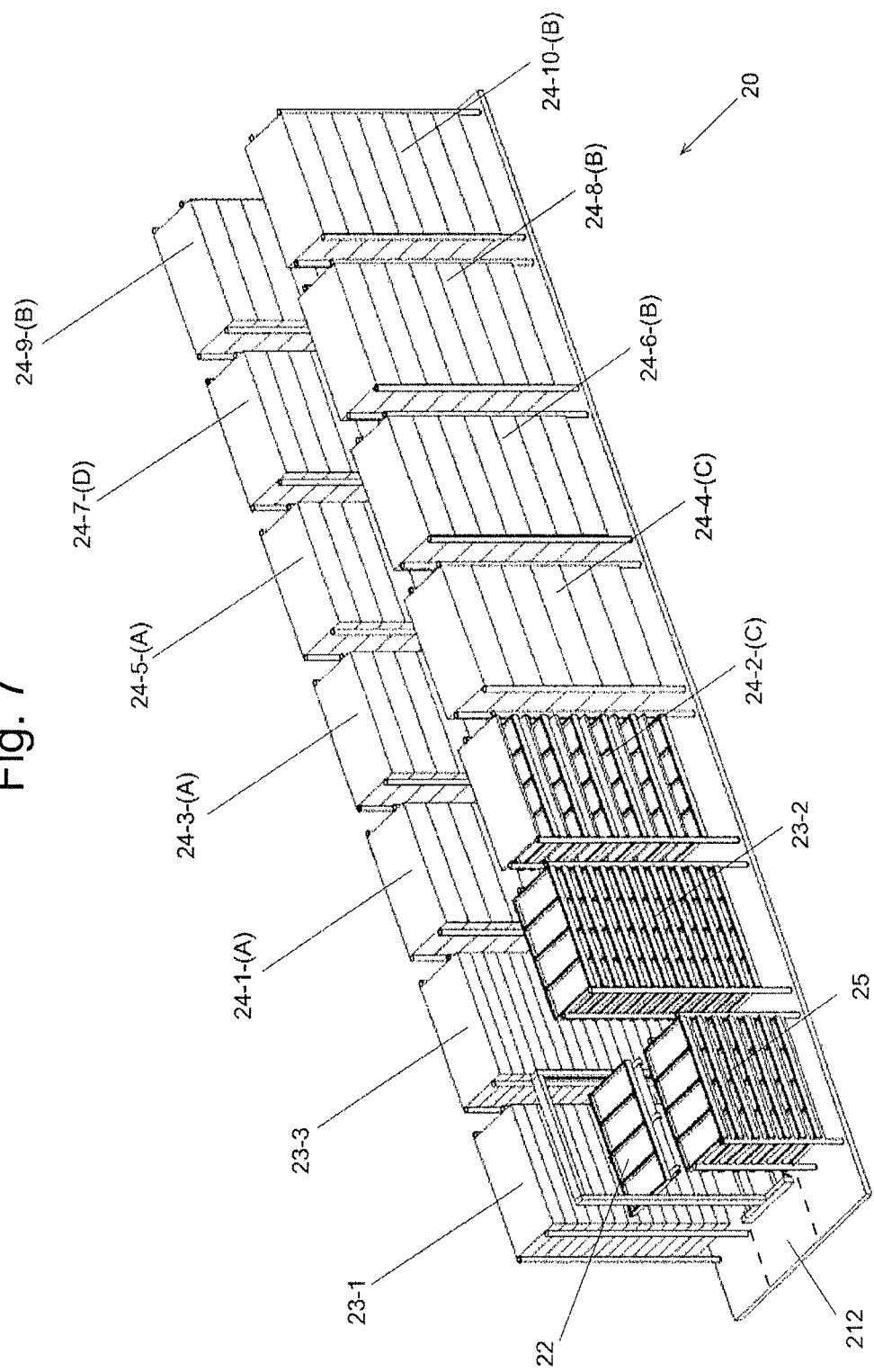
FIG. 7 is a perspective view illustrating a seedling growing system according to a second embodiment of the present invention.

The following describes a seedling growing system according to a second embodiment of the present invention with reference to FIGS. 7 to 9.

FIG. 7 is a perspective view illustrating a seedling growing system 20 according to the present embodiment. Similarly to the above-described seedling growing system 10 (FIG. 1), the seedling growing system 20 according to the present embodiment includes a cargo transport container as a storage. FIG. 7 omits illustration of the profile of the container. In the present embodiment, the cargo transport container is of a high-cube type, the height of an internal space of which is higher than that used in the first embodiment by approximately 300 mm. Thus, in the present embodiment, the number of racks is equal to that in the first embodiment, but a rack including a larger number of shelves can be housed.

In the present embodiment, a seedling growing tray rack for growing seedlings on seven seedling growing trays per day is used. The seedling growing tray rack includes three multi-shelf germination racks 23 (23-1 to 23-3) each including 14 shelves, ten multi-shelf seedling growing racks 24 (24-1 to 24-10) each including shelves in a number to be described later, and one multi-shelf shipment rack (work rack) 25 including seven shelves. In this example, the ten multi-shelf seedling growing racks 24 include a plurality of racks having different pitches. Each plant body housed in the multi-shelf seedling growing racks 24 is classified into a first growth stage at which the height of the plant body is equal to or smaller than 5 cm, a second growth stage at which the height of the plant body is equal to or smaller than 9 cm, or a third growth stage at which the height of the plant body exceeds 9 cm. Each plant body is housed in a rack having a pitch in accordance with the growth stage of each plant body. For example, it is appropriate that the pitch is 200 mm at the first growth stage, 240 mm at the second growth stage, and 280 mm at the third growth stage. In this case, when the pitch is constant in each rack, a rack housing plant bodies at the first growth stage includes eight shelves, a rack housing plant bodies at the second growth stage includes seven shelves, and a rack housing plant bodies at the third growth stage includes six shelves.

In the present embodiment, three multi-shelf seedling growing racks 24-1-(A), 24-3-(A), and 24-5-(A) each include eight shelves and are configured to house plant bodies at the first growth stage, four multi-shelf seedling growing racks 24-6-(B), 24-8-(B), 24-9-(B), and 24-10-(B) each include seven shelves and are configured to house plant bodies at the second growth stage, and two multi-shelf seedling growing racks 24-2-(C) and 24-4-(C) each include six shelves and are configured to house plant bodies at the third growth stage. One multi-shelf seedling growing rack 24-7-(D) includes seven shelves having different pitches. The seven shelves include five shelves having a pitch of 200 mm and in which five shelves of plant bodies at the first growth stage are housed and two shelves having a pitch of 280 mm and in which two shelves of plant bodies at the third growth stage are housed. These ten multi-shelf seedling growing racks 24 include, in total, 29 shelves having a pitch of 200 mm, 28 shelves having a pitch of 240 mm, and 14 shelves having a pitch of 280 mm. FIG. 8 illustrates front views (a) and perspective views (b) of the multi-shelf seedling growing racks 24-6-(B) including seven shelves, the multi-shelf seedling growing racks 24-2-(C) including six shelves, and the multi-shelf seedling growing racks 24-7-(D) including shelves having different pitches.

The seedling growing system 20 according to the present embodiment includes a movement robot 22 same as the movement robot 12 according to the first embodiment.

The following describes an exemplary seedling growing process using the seedling growing system according to the present embodiment. On the first seedling growing day, the movement robot 22 moves and transfers seven trays on which seedlings have germinated among seedling growing trays held by multi-shelf germination racks 23 (23-1 to 23-3) onto the first to seventh shelves of the multi-shelf seedling growing rack 24-1-(A) for the first growth stage. On the second seedling growing day, the seven trays on the first to seventh shelves of the multi-shelf seedling growing rack 24-1-(A) are moved and transferred onto the eighth shelf of the multi-shelf seedling growing rack 24-1-(A) and the first to sixth shelves of the multi-shelf seedling growing rack 24-3-(A). Seven trays on which the seedlings have newly germinated are moved and transferred onto the first to seventh shelves of the multi-shelf seedling growing rack 24-1-(A) after the first seven trays have been transferred, thereby performing the same movement one day behind. The following only describes movement of the first seven trays. On the third seedling growing day, the first seven trays are moved and transferred onto the seventh and eighth shelves of the multi-shelf seedling growing rack 24-3-(A) and the first to fifth shelves of the multi-shelf seedling growing rack 24-5-(A). On the fourth seedling growing day, the first seven trays are moved and transferred onto the sixth to eighth shelves of the multi-shelf seedling growing rack 24-5-(A) and the first to fourth shelves of the multi-shelf seedling growing rack 24-7-(D). At this stage, the seedlings each have the height of about 5 cm. The first seven trays are moved and transferred onto all shelves of the multi-shelf seedling growing rack 24-9-(B) for the second growth stage on the fifth seedling growing day, onto all shelves of the multi-shelf seedling growing rack 24-10-(B) for the second growth stage on the sixth seedling growing day, onto all shelves of the multi-shelf seedling growing rack 24-8-(B) for the second growth stage on the seventh seedling growing day, and onto all shelves of the multi-shelf seedling growing rack 24-6-(B) for the second growth stage on the eighth seedling growing day. At this stage, the seedlings each have the height of about 10 cm. The first seven trays are moved and transferred onto all shelves of the multi-shelf seedling growing rack 24-4-(C) and the first shelf of the multi-shelf seedling growing rack 24-2-(C) on the ninth seedling growing day, and onto the second to sixth shelves of the multi-shelf seedling growing rack 24-2-(C) and the sixth and seven shelves of the multi-shelf seedling growing rack 24-7-(D) on the tenth seedling growing day. The seedlings are shipped on the next day, in other words, after seedling growing in 10 days has ended. FIG. 9 illustrates the scheme of moving a seedling growing tray between multi-shelf seedling growing racks in the exemplary seedling growing process. In FIG. 9, movement of the sixth tray is indicated with arrows. In this cultivation, the fifth shelf of the multi-shelf seedling growing rack 24-7-(D) is a backup and not used.

The above description is made with the example in which the seedling growing duration is 10 days, but the present invention is also applicable to seedlings, the seedling growing duration of which is 20 days by sowing every two days. When the seedling growing duration is shorter, cultivation may be performed by only using some shelves of the multi-shelf seedling growing racks 24. In addition, the number of shelves of a multi-shelf seedling growing rack for each pitch may be changed from that in the above-described example. These changes may be combined for application to plants having various kinds of seedling growing durations.

Another multi-shelf seedling growing rack is needed for cultivation in which shelves of each rack have the same height, and seven trays of seedlings having a seedling growing duration of 10 days are subjected to sowing and shipment per day as described above. However, in the present embodiment, the single multi-shelf seedling growing rack 24-7-(D) includes shelves with a plurality of pitches, which leads to saving of an installation space for one rack.

In the present embodiment, the total number of shelves of the ten multi-shelf seedling growing racks 24 is 71 shelves, and accordingly, the area and productivity of cultivation both increase by 40% as compared to the total number of shelves of the multi-shelf seedling growing racks 14 according to the first embodiment, which is 50 shelves.

Figure 10:
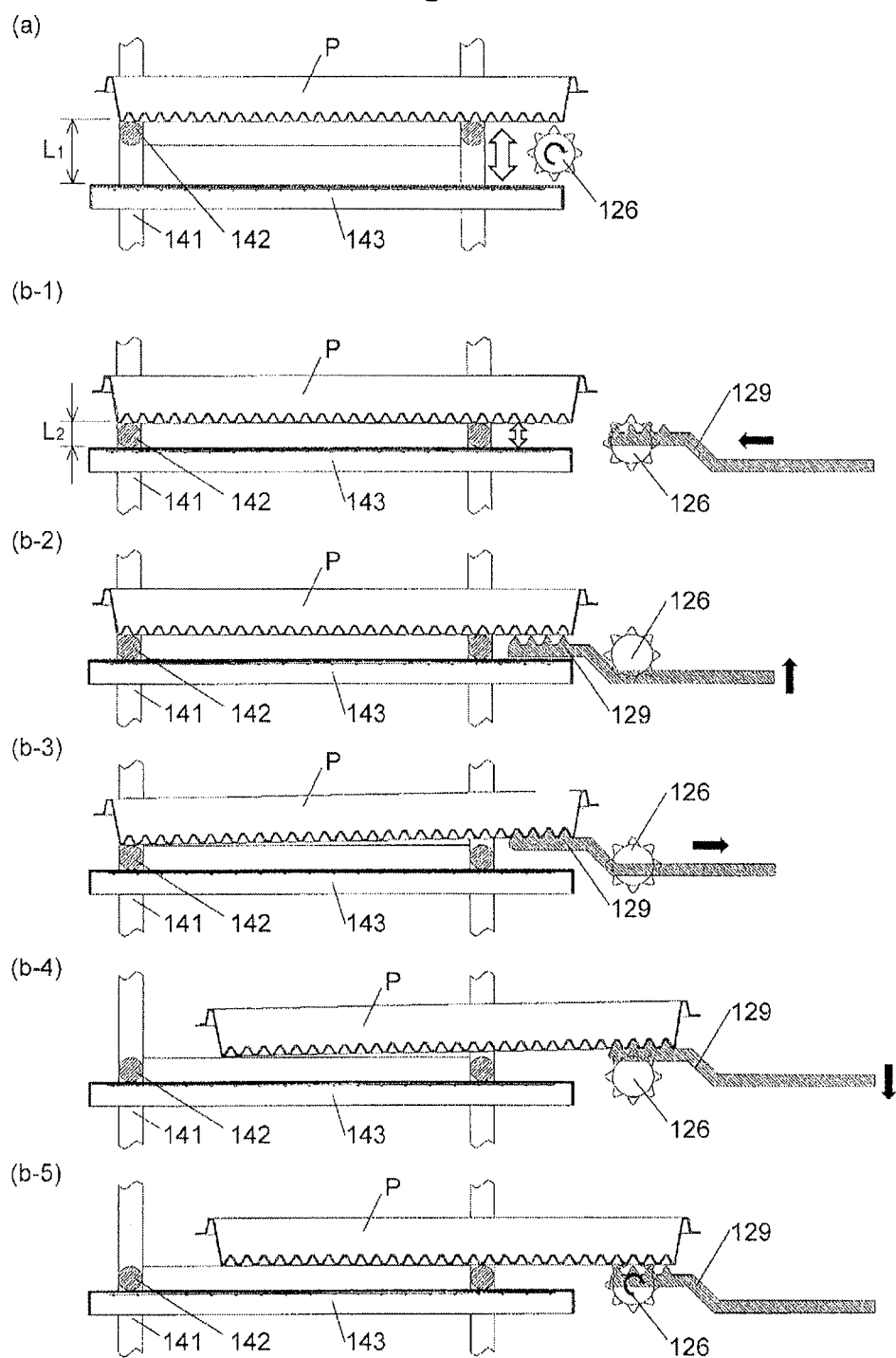
FIG. 10 illustrates cross-sectional views of movement of a seedling growing tray in each of the seedling growing system according to the first embodiment (a) and a seedling growing system according to a third embodiment ((b-1) to (b-5)).

The following describes a seedling growing system according to a third embodiment of the present invention with reference to FIG. 10. The present embodiment describes another aspect of the transfer means of the movement robot 12 described in the first embodiment, and any other configuration is same as that of the second embodiment.

First, for comparison, the transfer means in the first and second embodiments will be described with reference to FIG. 10(*a*). FIG. 10(*a*) illustrates the pad P and the pinion gears 126 corresponding to FIG. 6(*a*-2) and the vicinity of them, and illustrates the frame of a transfer target seedling growing tray rack, which is omitted in FIG. 6. The transfer target seedling growing tray rack illustrated in FIG. 10 is the multi-shelf seedling growing rack 14. The multi-shelf seedling growing rack 14 includes a support 141 and also includes, at each shelf, a pad holder 142 configured to hold the pad P, and an illumination apparatus 143 provided above the pad P held by the pad holder 142. In the transfer means according to the first embodiment, a space enough for the sum of the diameter of each pinion gear 126 and an allowance necessary for operation is needed in the height direction to move and operate the pinion gears 126 between the pad P and the illumination apparatus 143 of a shelf below when the pad P is taken out from the multi-shelf seedling growing rack 14. A typical pinion gear has a diameter of 60 mm, and thus a height L1 between a lower end of the pad P and an upper end of the illumination apparatus 143 is about 80 mm, which includes the allowance.

The transfer means according to the third embodiment includes the pinion gears 126 and a hook arm 129 as an auxiliary movement means as illustrated in FIGS. 10(*b*-1) to (*b*-5). The hook arm 129 includes, at a leading end, steps that mesh with the steps on the bottom surface of the pad P.

FIG. 10(*b*-1) to (*b*-5) illustrate the operation of taking out the pad P from the multi-shelf seedling growing rack 14 by the transfer means. First, the elevation table 124, which same as that in the first embodiment, adjusts the hook arm 129 to a height at which the hook arm 129 enters between the lower end of the pad P and the illumination apparatus 143. Subsequently, the hook arm 129 moves to the left in FIG. 10(*b*-1) so that the hook arm 129 is moved between the pad P and the illumination apparatus 143. After being moved until several steps can be meshed with each other, the hook arm 129 is moved up (b-2) to mesh the steps of the hook arm 129 with the steps on the bottom surface of the pad P. Then, the pad P is pulled out by moving the hook arm to the right (b-3). The pad P is moved to a position where the steps on the bottom surface of the pad P can be meshed with the pinion gears 126, and then the hook arm 129 is moved down (b-4) to mesh the steps on the bottom surface of the pad P with the teeth of the pinion gears 126 (b-5). Thereafter, similarly to the first embodiment, the pad P is taken out from the multi-shelf seedling growing rack 14 through rotation of the pinion gears 126.

The following describes the operation of taking the pad P into the multi-shelf seedling growing rack 14 with reference to FIG. 11. The take-in operation corresponds to the above-described take-out operation when oppositely performed. First, after the pad P is moved halfway to a shelf as the transfer destination through rotation of the pinion gears 126 (a-1), the hook arm 129 is moved up to mesh the steps of the hook arm 129 with the steps on the bottom surface of the pad P (a-2). In this state, the hook arm 129 is moved to the left in the FIG. 11 to push the pad P all the way into the shelf as the transfer destination (a-3). After having reached a predetermined position, the hook arm 129 is moved downward to remove the meshing between the steps of the pad P and the steps of the hook arm 129 (a-4). Thereafter, the hook arm 129 is moved to the right in FIG. 11 to a standby position (a-5), which completes the take-in operation (a-6).

According to the third embodiment, since the thickness of the hook arm 129 is smaller than the diameter of each pinion gear 126, a height L2 of a gap as a space into which the hook arm 129 is moved between the lower end of the pad P and the upper end of the illumination apparatus 143 of one shelf below is smaller than the height L1 in the first embodiment, thereby achieving space saving in the height direction.

In the present embodiment, since the hook arm 129 is used in the transfer means, the height of a space occupied by the transfer means can be reduced, and thus the number of shelves of seedling growing tray racks that can be housed in the container can be increased. For example, the numbers of shelves of ten multi-shelf seedling growing racks (including 71 shelves in total) and one multi-shelf shipment rack (including seven shelves in total) according to the second embodiment having a common configuration except for the transfer means can be increased by one for each rack so that the total number of shelves of the multi-shelf seedling growing racks is 81 and the number of shelves of the multi-shelf shipment rack is eight. As a result, the area and productivity of cultivation can be increased. Since the multi-shelf germination racks include shelves (30 shelves; a little over four days) in a number larger than the number of shelves for the actual number of days (one to three days) taken for germination in the second embodiment, the number of shelves does not need to be increased in the third embodiment. When the number of shelves of the multi-shelf shipment rack is increased, the pitch decreases, which makes it difficult to perform shipment work, and thus the multi-shelf shipment rack is preferably provided with casters. With this configuration, the multi-shelf shipment rack on which a seedling growing tray with seedlings grown to a shipment stage is mounted can be taken out from the container to transfer the seedling growing tray onto another rack having a larger pitch outside of the container, thereby performing shipment work.

REFERENCE SIGNS LIST 10, 20 . . . Seedling Growing System
11 . . . Container (Storage)
111 . . . Door
112, 212 . . . Path
12, 22 . . . Movement Robot (Movement Means)
121 . . . Wheel
122 . . . Truck
123 . . . Support
124 . . . Elevation Table
125 . . . Slide Table
126 . . . Pinion Gear
127 . . . Protrusion
128 . . . Double Timing Belt
129 . . . Hook Arm
13, 23 . . . Multi-shelf Germination Rack
14, 24 . . . Multi-shelf Seedling Growing Rack
141 . . . Support
142 . . . Pad Holder
143 . . . Illumination Apparatus
15, 25 . . . Multi-shelf Shipment Rack
P . . . Pad

The invention claimed is:

1. A seedling growing system comprising:
a) a storage provided with heat insulating treatment;
b) a movement means configured to move on a predetermined path in the storage;
c) seedling growing tray racks including:
a multi-shelf germination rack configured to hold, until germination, a seedling growing tray on which seeds are sown,
a multi-shelf seedling growing rack configured to hold a seedling growing tray on which seedlings have germinated, and
a multi-shelf shipment rack configured to hold a seedling growing tray for shipping grown seedlings,
the multi-shelf germination rack, the multi-shelf seedling growing rack, and the multi-shelf shipment rack being disposed side by side on a side or sides of the path in the storage; and
d) a transfer means provided to the movement means, including:
a holding unit;
a pinion gear capable of meshing with steps on a bottom of the seedling growing tray and provided at a leading end of the holding unit; and
an auxiliary movement means comprising an arm including, at a leading tip thereof, steps capable of meshing with the steps on the bottom of the seedling growing tray, the auxiliary movement means being configured to move the leading tip from below a position where the seedling growing tray is placed on the multi-shelf germination rack, the multi-shelf seedling growing rack, or the multi-shelf shipment rack toward the holding unit and from the holding unit toward below the position, wherein the steps on the bottom of the seedling growing tray are aligned in a movement direction of the leading tip.

2. The seedling growing system according to claim 1, further comprising an environment control means configured to control an environmental factor in the storage in accordance with a plant being grown.

3. The seedling growing system according to claim 1, wherein the multi-shelf shipment rack is placed closer to a door of the storage than the multi-shelf germination rack and the multi-shelf seedling growing rack.

4. The seedling growing system according to claim 1, wherein the path is placed to a center in the storage to extend inward from a door of the storage, and the seedling growing tray racks are arranged on both sides of the path.

5. The seedling growing system according to claim 1, wherein the storage is a cargo transport container.

6. The seedling growing system according to claim 1, wherein the seedling growing tray racks include shelves having different pitches between the seedling growing tray racks.

7. The seedling growing system according to claim 6, wherein the seedling growing tray racks each include a plurality of shelves having different pitches between the shelves.

8. A seedling growing system comprising:
a) a storage provided with heat insulating treatment;
b) a movement means including a mounting part for mounting a seedling growing tray and configured to move on a predetermined path in the storage;
c) seedling growing tray racks including:
a multi-shelf germination rack configured to hold, until germination, a seedling growing tray on which seeds are sown,
a multi-shelf seedling growing rack configured to hold a seedling growing tray on which seedlings have germinated, and
a multi-shelf shipment rack configured to hold a seedling growing tray for shipping grown seedlings,
the multi-shelf germination rack, the multi-shelf seedling growing rack, and the multi-shelf shipment rack being disposed side by side on a side or sides of the path in the storage; and
d) a transfer means provided to the movement means, including:
d-1) an arm including a leading tip that is movable from below a position where a seedling growing tray is placed on one of the seedling growing tray racks toward the mounting part; and
d-2) steps fixed to the leading tip and capable of meshing with steps on a bottom of a seedling growing tray, the steps on the bottom of the seedling growing tray being aligned in a movement direction of the arm when the seedling growing tray is placed on one of the seedling growing tray racks, the transfer means being configured to transfer each seedling growing tray between the mounting part and each of the multi-shelf germination rack, the multi-shelf seedling growing rack, and the multi-shelf shipment rack.

* * * * *